United States Patent [19]
Jacobsen

[11] Patent Number: 6,164,588
[45] Date of Patent: Dec. 26, 2000

[54] REEL ASSEMBLY

[75] Inventor: William W. Jacobsen, Lewisville, N.C.

[73] Assignee: Wood Composite Technologies, Inc., Statesville, N.C.

[21] Appl. No.: 09/264,423

[22] Filed: Mar. 8, 1999

[51] Int. Cl.$^7$ .................................................. B65H 75/14
[52] U.S. Cl. .................................. 242/610.4; 242/610.6; 242/608.4
[58] Field of Search ............................ 242/610.4, 610.6, 242/610, 608.2, 608.4

[56] References Cited

U.S. PATENT DOCUMENTS

| | | |
|---|---|---|
| 2,642,359 | 5/1953 | Scott . |
| 3,764,456 | 10/1973 | Woodhams . |
| 3,943,079 | 3/1976 | Hamed . |
| 4,474,846 | 10/1984 | Doerer et al. . |
| 4,559,376 | 12/1985 | Kubat et al. . |
| 4,791,020 | 12/1988 | Kokta . |
| 4,977,930 | 12/1990 | Munk et al. . |
| 5,120,776 | 6/1992 | Raj et al. . |
| 5,149,576 | 9/1992 | Potts et al. . |
| 5,288,772 | 2/1994 | Hon . |
| 5,316,834 | 5/1994 | Matsuda et al. . |
| 5,435,954 | 7/1995 | Wold . |
| 5,776,281 | 7/1998 | Evans . |

Primary Examiner—Donald P. Walsh
Assistant Examiner—William A. Rivera
Attorney, Agent, or Firm—Moore & Van Allen, PLLC; Dominic J. Chiantera

[57] ABSTRACT

A cable reel assembly (20) includes plastic flanges (22, 24) fabricated from a thermoplastic and wood composite material comprising a discontinuous lignocellulose wood fiber filler in combination with a thermoplastic compound and a coupling agent.

57 Claims, 4 Drawing Sheets

REEL ASSEMBLY

CROSS REFERENCE TO RELATED APPLICATIONS

Some of the material disclosed and claimed in this application is also disclosed in copending U.S. patent application Ser. No. 09/119,257, entitled: *Lignocellulose Fiber Filler For Thermoplastic Composite Compositions*, filed by me on Jul. 20, 1998.

DESCRIPTION

1. Technical Field

This invention relates to reel assemblies, and more particularly to reel assemblies having plastic flanges.

2. Background Art

As known, reels are revolvable devices onto which something flexible may be wound or "spooled". In industrial applications reels are used to package flexible lineal type products, such as wire, telecommunication cable, electrical cable, textiles, hose and the like, for transport, handling, storage, protection, and dispensement. These industrial reels include two annular discs, referred to as flanges, and one or more central members, referred to as staves, hubs, or drums, which are joined to the flanges to form a unitary structure. The National Electrical Manufacturers Association (NEMA) defines a "reel" as having a flange measuring 8 inches or more in diameter.

Prior art reel assemblies are constructed of different materials, including bonded plywood, nailed dimensional lumber, steel, and plastic or other synthetic materials. The required load carrying capacity of the reel generally determines the material to be used. According to NEMA specifications the load carrying capacities of the different type material reels include: 1900 to 40,000 pounds for steel, 550 to 15,000 pounds for nailed dimensional lumber, and 100 to 3500 pounds for plywood flanged reels.

With increasing regulatory pressure to divert solid waste from landfills and increasing landfill tipping fees, there is an increased incentive to recycle and reuse these reels. Among the different material types, wooden reels are the least expensive and are preferred in lighter payload applications. They are, however, the least likely to be reused because of deterioration of the wooden structures due to handling and weather exposure, which results in moisture absorption, warpage, protruding nails, discoloration and splintering. In addition, even with new dimensional wood reel structures, raised nail heads on the flanges may catch and crimp cable products when they are dispensed, resulting in cable damage.

Steel reels are the most expensive assemblies, but they have the highest payload and are the most durable. Although steel reels have a high initial cost, their recyclability allows for cost amortization with reuse. If there is an effective, reel recovery and reuse network, steel reels become attractive even for discretionary use applications. However, when reel recycling networks are not well established, wooden reels are preferred over steel in lighter applications due to the cost differential.

Plastic flanged reels represent an alternative to wooden reels because they withstand the deteriorating effects of weather and handling, so as to make them a better candidate for recycling than wooden reels. However, plastic flanged reels, particularly those with flange diameters in excess of thirty inches, lack sufficient stiffness and durability for even normal handling. As a result industry standards for plastic reels having flanges greater than 24 inches have not been adopted.

Known methods for overcoming the plastic reel distortion and durability problems have involved the pre-stressing or pre-tensioning the plastic flanges into a parabolic shape during manufacture. As disclosed in U.S. Pat. No. 5,605,305, entitled Knock-Down, Returnable, High Load Capacity Plastic Cable Reel, and issued Feb. 25, 1997 to Valentine Picton, the pre-tensioning is accomplished by allowing a thermoplastic material to cool and shrink to a particular shape within a designed cavity mold. The curing time ranges from 45 to 90 minutes. This results in a reel with improved rigidity, strength and durability over traditional plastic reels, however, the excessive mold times are too long. The resulting lower rate of productivity adds cost, thereby eliminating the commercial appeal of the plastic reel as a replacement for wooden reels.

Disclosure of Invention

One object of the present invention is to provide large diameter plastic reel assemblies having increased durability. Another object of the present invention is to provide large diameter plastic reel flanges having sufficient structural stiffness for use in heavy payload applications. Still another object of the present invention is to provide a new process for manufacturing large diameter plastic reel assemblies.

According to one aspect of the present invention, a cable reel assembly includes plastic flanges comprising a thermoplastic and wood composite material having: about 20 to about 50 percent by weight of a discontinuous lignocellulose wood fiber filler, about 40 to about 70 percent by weight of a thermoplastic, and up to about 10 percent by weight of a coupling agent. In further accord with this aspect of the present invention at least about 20 percent by weight of the lignocellulose wood fiber has a length of at least about 15 millimeters and a diameter of less than about 0.5 millimeters. In still further accord with this aspect of the present invention the thermoplastic component comprises polyethylene. In still yet further accord with this aspect of the present invention the moisture content of the discontinuous lignocellulose fiber filler is less than 5 percent by weight of the filler to avoid blistering in the molded composite flange. In still yet further accord with the present invention, the coupling agents used in the composite material include maleic anhydride grafted polyethylene (MAPE) and ethylene methacrylic (EMA), at concentrations of up to about 5 percent and 10 percent by weight, respectively.

According to another aspect of the present invention, a process for making an improved plastic flange structure includes the steps of: blending the herein before described composite components in a low shear mixing device, extruding the composite mixture through a single screw extruder at an extruder operating temperature of less than about 450° F., and performing cold compression molding of the mixture in a flange mold, at a mold temperature of less than 120° F. for a period of less than about 4 minutes, and thereafter providing air or water cooling of the molded composite flange to restore it to ambient temperature. In further accord with this aspect of the present invention the cold compression is performed with a minimum pressure of about 220 tons. In still further accord with this aspect of the invention, the cold compression occurs in a two-piece flange mold.

The plastic reel assemblies of the present invention have improved flange stiffness due to reinforcement of the flange thermoplastic material with a lignocellulose fiber filler comprising hair-like fibers that, in the presence of a coupling agent, substantially improves the tensile and flexural properties of the thermoplastic. This is accomplished by incorporating the discontinuous lignocellulose fiber filler in the thermoplastic composite composition at concentrations ranging from about 20 to about 50 percent by weight of the composite. The lower concentrations of fiber filler are preferred in reel flanges under 36 inches in diameter for improved flexibility. Such cable reels generally carry lighter loads and are prone to more abusive manual handling. Conversely, higher concentrations of the fiber filler are preferred in reels in excess of 36 inches in diameter. The higher fiber loading rates yield reels with greater stiffness and strength.

Polyethylene is the preferred thermoplastic component of the present invention since it retains its strength performance properties at temperature from −20° F. to 140° F., making the present reel assemblies suitable for outdoor applications. Furthermore, polyethylene is readily available on the recycled market which, on the basis of cost may be preferred.

Thermoplastic melt flow, as measured by ASTM DI238, has an impact on the composite flange's drop performance. As the melt flow index of the thermoplastic declines the destructive drop performance of the flange improved. For use in the present invention, a thermoplastic or mixtures of thermoplastics having melt flow indices of up to about 10 grams/min. produced a composite cable reel flange with suitable destructive drop performance characteristics. A preferred fractional melt flows of less than 1 gram/10 min. yielded excellent results. When polyethylene or a mixture of polyethylenes is used the preferred melt flow is less than about 6 grams/10 min.

The coupling agent improves the physical properties of the composite by forming a bridge that bonds the thermoplastic and the wood fiber at the interface between the two dissimilar materials. Cable reel flanges without such coupling agents failed to perform as well as wood flanges in destructive drop testing. For outdoor cable reel applications, a UV stabilizer may be added at a concentration of up to 0.5 percent by total composite weight.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
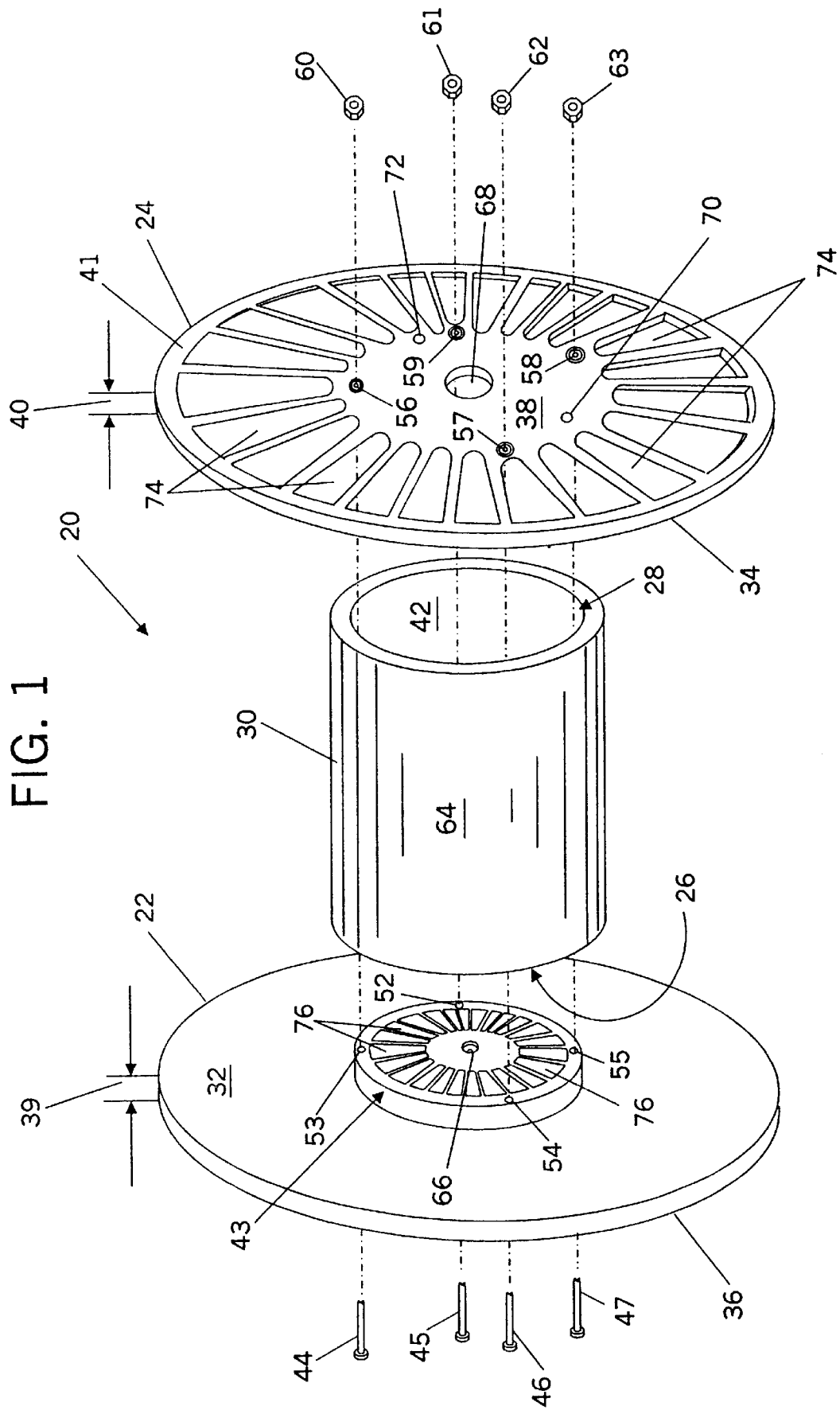
FIG. 1, is an exploded, perspective view of a best mode embodiment of a reel assembly according to the present invention.

Referring to FIG. 1, in an exploded perspective view of the reel assembly 20 of the present invention, composite thermoplastic flange structures 22, 24 are adapted for mounting to opposite ends 26, 28 of a central member 30, such as a stave or drum. The flange structures 22, 24 are substantially round, disk-like structures with inner, or first major surfaces 32. 34, and outer, or second major surfaces 36, 38, respectively. The major surfaces are spaced apart at a maximum thickness, as shown at reference 39 for the flange 22 which, as shown at reference 40 of the flange 24 corresponds to the thickness of an outer, or circumferential rim 41 disposed along the flange perimeter.

In the FIG. 1 embodiment the central member, or drum 30 is hollow, having a central aperture which extends between the drum's axial ends 26, 28 (as shown by the opening 42 at the axial end 28). The drum's inside diameter is adapted in size to slip over a hub 43 which projects from the inner surfaces 32, 34 of the flanges structures 22, 24. In assembly, the drum is captured at each end by the flange hubs 43 and the flange structures are fixedly mounted to the drum 30 in a releasable manner through the use of bolts, or tie-rods 44–47 which pass through hub mounting holes 52–55 in the flange 22, through the drum interior, and through mounting holes 56–59 in flange 24, to engage fasteners 60–63. The drum 30 further includes a working surface 64 onto which the flexible, lineal goods may be wound or spooled.

The substantially circular, disk-like flanges 22, 24 each have a centrally located arbor hole 66, 68 which, with the central aperture of the drum 30, permits a shaft (not shown) to be placed through the reel assembly for the purpose of storage, or to permit rotation of the reel to dispense goods. Preferably, the flanges also have "drive" holes 70, 72 located in their outer surfaces 36, 38, which are adapted to receive a drive pin, or bar to allow an operator to rotate the reel about the shaft.

As described in detail hereinafter with respect to FIGS. 2–5, a best mode embodiment the flange structures 22, 24 includes structural arrays 74, 76 disposed on the outer and inner surfaces of the flange. The arrays comprise a plurality of structural elements, such as ribs, gussets, and one or more rims, such as the circumferential rim 41, which are formed on the flange surfaces, including the inner surface (32) hub (43). The arrays 74, 76 generally extend radially from the central arbor holes 66, 68. The array 76 is contained within the hub 43 and the array 74 is disposed in the outer periphery of the outer flange surface; generally outside of the surface area occupied by the hub, such that the combination of the arrays 74, 76 extend substantially from the arbor hole to the outer perimeter of the flange. As described in further detail hereinafter the structural arrays stiffen the flange surfaces, thereby improving the stiffness characteristic and strength of the flange.

The reel assembly flanges 22, 24 are molded from a wood fiber thermoplastic composite material. One thermoplastic composite material suitable for use in the present invention is disclosed and claimed in copendending patent application, Ser. No. 09/119,257, entitled: Lignocellulose Fiber Filler For Thermoplastic Composite Compositions, which was filed by me on Jul. 20, 1998 and which is incorporated by reference herein. The thermoplastic composition is reinforced with lignocellulose fiber filler consisting of long, hair-like fibers which, in the presence of a coupling agent, dramatically improve the tensile and flexural properties of the thermoplastic. The flange structures are formed from this material in selected ones of a plurality of structural form which are molded into the flange major surfaces.

The flange body and form are produced by the following process. The constituent parts of the above referenced composite material are blended in a known type, low shear mixing device. The mixture is then extruded through a known type single screw extruder at an extruder operating temperature of less than about 450° F. The extruder may be a Sterling six-inch extruder with a 34:1 screw compression ratio. The low shear mixing and single screw extrusion is preferred to minimize wood fiber fracturing or breakage, since the loss of wood fiber length may result in lost tensile and flexural properties of the finished flange structure.

Preferably, the composite material is extruded at temperatures that range from about 350° F. to 400° F. Under 350° F., the thermoplastic viscosity is too high to allow for adequate mixing of the components. Extruding at temperatures in excess of 450° F. bums the wood fiber. Both conditions result in reduced composite cable reel flange performance properties. Furthermore, composite extruded with temperatures in excess of 400° F. requires additional cooling while still in the mold. The additional cooling time results in lower productivity, adding to the cost of the finished product.

Next, the extruded material is then cold compression molded into the desired structural form using a two piece mold, at a mold temperature which is preferably less than 120° F. and for a period of less than about 4 minutes. The compression molding occurs at a minimum pressure of about 220 tons. At the end of the mold period air or water may be used to further cool the molded composite flange to ambient temperature.

Cold compression molding at less than 120° F. is preferred due to the lower incurred energy costs, as compared with either hot compression molding or injection molding. The lower mold temperature leads to faster cooling of the extruded shot, which in turn reduces product costs. At about 120° F. the mold cycle time for the improved composite cable reel flange is about 3 minutes.

Two piece compression molds are designed to facilitate flow of the hot composite shot under pressure. When such pressure falls below about 220 tons, the hot composite shot fails to adequately fill out the mold uniformly resulting in culled composite cable reel flanges. Such compression mold equipment may be represented, for example, by a PSR model PS300s Hydraulic Press.

The described process yields a flange body comprising a polyethylene discontinuous lignocellulose composite material of about 20 to about 50 percent by weight of a discontinuous lignocellulose wood fiber filler, about 40 to about 70 percent by weight of a thermoplastic; and up to about 10 percent by weight of a coupling agent. At least about 20 percent by weight of the lignocellulose wood fiber has a length of at least about 15 mm. and a diameter of less than about 0.5 mm. The resulting flange body exhibits a Flexural Modulus of at least about 1000 MPa, a Tensile at Breakpoint strength of at least about 19 MPa, and a Notched Izod Value of at least about 40 J/M and an elongation of greater than 2%. These structural characteristics provide reel assemblies with physical performance properties which compare favorably to reel assemblies derived from plywood or nailed dimension lumber, but at a lower net weight.

The improved strength and stiffness of the new cable reel flange is accomplished by incorporating the discontinuous lignocellulose fiber filler at concentrations ranging from about 20 to about 50 percent by weight of the composite. The lower concentrations of fiber filler are preferred for use in reel flanges under 36 inches in diameter for improved flexibility. Such cable reels generally carry lighter loads and are prone to more abusive manual handling. Conversely, higher concentrations of the fiber filler are preferred in reels in excess of 36 inches in diameter. The higher fiber loading rates yield reels with greater stiffness and strength.

Softwood or hardwood fiber filler, such as that which can be derived, for example, from Southern Pine or Poplar, respectively, are suitable for use in the present invention. Moreover, to reduce cost, the hardwood or softwood fiber may be derived from wood waste, such as discarded pallets and the like. The moisture content of the discontinuous lignocellulose fiber filler is preferred to be less than 5 percent by weight of the filler to avoid blistering in the molded flange. Blistering is a result of excessive moisture in the wood fiber that vaporizes into steam during the extrusion phase of the composite production process.

In accordance with the present invention, there are a wide variety of thermoplastic polymers that may be used in the flange wood-thermoplastic composite material. These include polyethylene, polyester, PVC and nylon, however, polyethylene is preferred. Polyethylene's performance properties are substantially consistent over temperatures ranging from −20° F. to 140° F., such that reel assemblies using polyethylene are suitable for outdoor applications. Furthermore, polyethylene is readily available on the recycled market which, on the basis of cost, may be preferred over non-recycled resin.

Thermoplastic melt flow, as measured by ASTM DI238, has an impact on the composite flange's drop performance, i.e. the survivability of a loaded reel assembly when dropped from a prescribed height; typically 4 feet. The results of tests performed indicates that as the fabrication process melt flow index of the thermoplastic declines, destructive drop performance of the flange improves. For use in the present invention a thermoplastic or mixtures of thermoplastics with a melt flow index of up to about 10 grams/min. produced a composite reel flange with suitable drop performance characteristics. A preferred fractional melt flow index of less than about 1 gram/10 min. yielded excellent results.

When polyethylene or a mixture of polyethylenes is used the preferred melt flow is less than about 6 grams/10 min. As the melt flow of the polyethylene declines the IZOD impact and elongation properties of the discontinuous lignocellulose fiber filled polyethylene composite improves. As these properties improve the destructive drop performance of empty and loaded composite cable reels improve; resulting in reels with equal or superior durability over nailed wood and plywood reels.

The preferred coupling agents for use in the present invention include maleic anhydride grafted polyethylene (MAPE) and ethylene methacrylic (EMA) at concentrations up to about 5 percent and up to about 10 percent by weight, respectively, of the composite. The coupling agent improves the physical properties of the composite material flange structure by forming a bridge that bonds the thermoplastic and the wood fiber at the interface between the two dissimilar materials. Similarly, for outdoor cable reel applications, a UV stabilizer may be added at a concentration of up to 0.5 percent of total composite weight. Other additives, such as colorants, flame retardants, and plasticizers may be added to the composite material to provide the improved composite cable reel flanges with characteristics necessary for given the application.

The composite material flange bodies may be provided in various large diameter sizes, as required for use in storing different type and different weight flexible goods. The actual diameter is selected based on the volume, weight, and characteristics of the end product to be placed on the reel. For example, fiber optic cable has a maximum bending ratio of 20:1, such that a 1-inch thick fiber cable must be loaded on a cable reel with a hub 30 (FIG. 1) no less than about 20 inches in diameter.

Although the preferred embodiment of the flange structure is that of the structures 22, 24, which incorporate the structural arrays 74, 76, the present wood-thermoplastic composite material flange bodies may be used directly, without structural reinforcement; the difference is the flange body thickness and weight. Without the structural elements the flange body would have a substantially planar geometry, with first and second major surfaces (inner surfaces 32, 34 and outer surfaces 36, 38) being spaced apart at a substantially uniform dimensional thickness, i.e. the equivalent thickness 40 of the circumferential rim 41.

Generally the flange thickness 39, 40 the distance between the inner and outer major surfaces 32, 34 and 36, 38, increases with increased flange diameter, or with the increased weight (payload) requirements of the end products to be stored on the reel. This is also true for the known type material flanges, including wooden flanges. However, the addition of structural elements, such as, but not limited to, the arrays 74, 76 (FIG. 1) of ribbed structures, rim structures, intermediate circumferential rims, rib gussets, and extended bosses, increase the strength, stiffness and durability performance properties of any material type flange so as to mitigate the need for increased thickness of the flange for a given diameter or payload requirement. The composite flanges of the present invention are similarly capable of incorporating these same features with like results. Molding these various structural elements into the flange body results in a flange structure having comparable strength and durability performance characteristics as a planar flange body, but at a smaller flange thickness.

Figure 2:
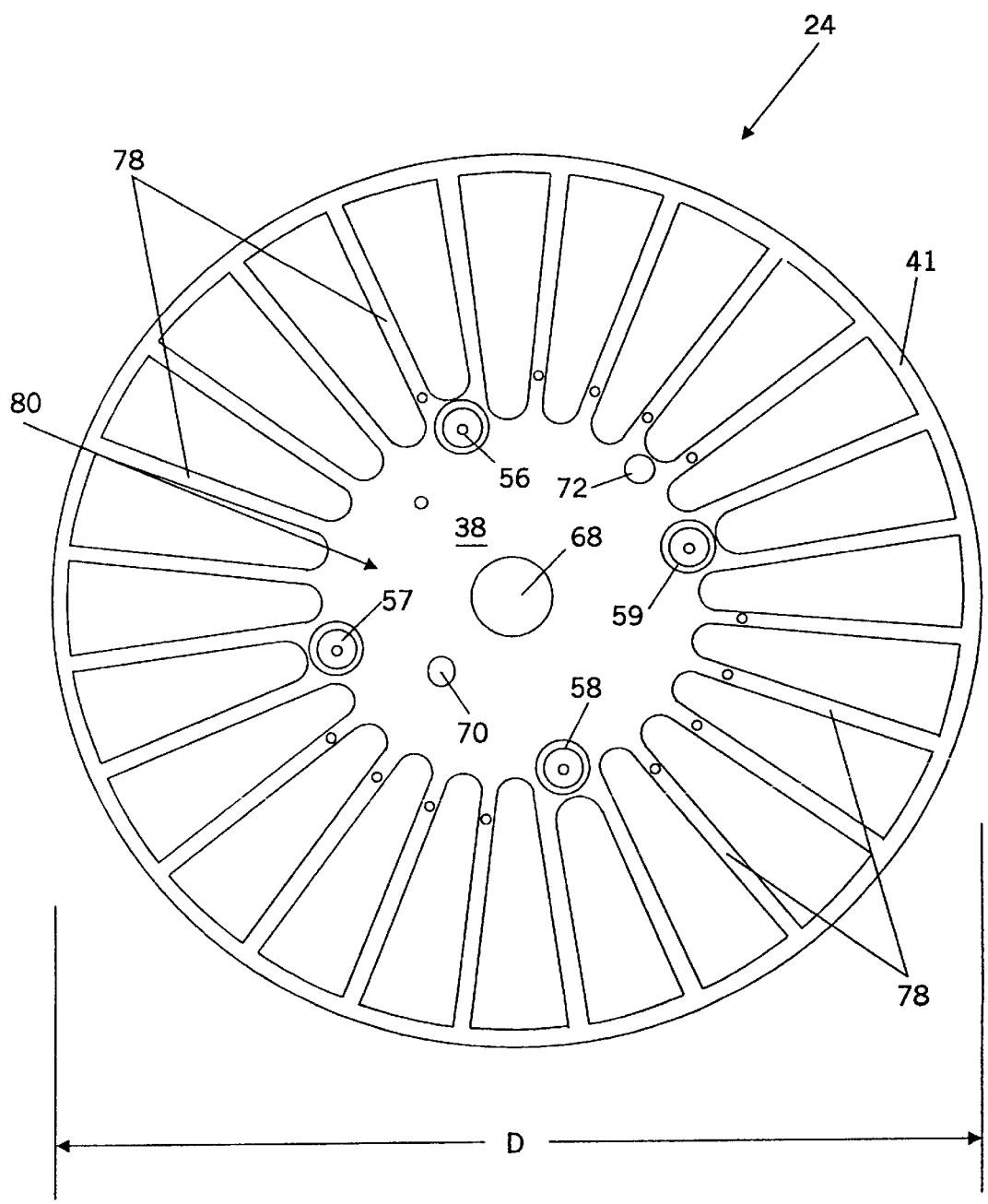
FIG. 2, is a plan view of a first major surface of a flange structure suitable for use in the embodiment of FIG. 1.
Figure 3:
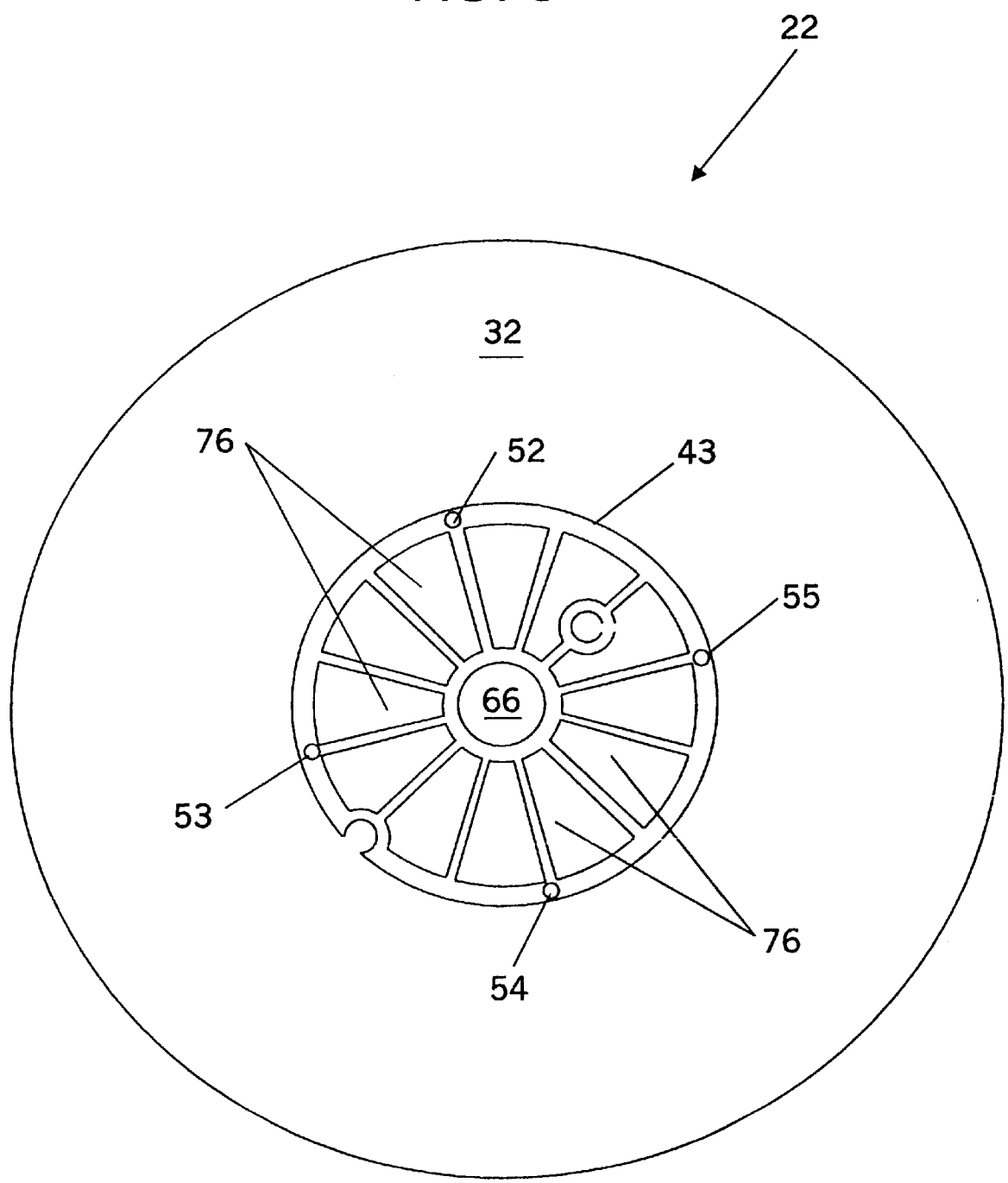
FIG. 3, is a plan view of a second major surface of a flange structure suitable for use in the embodiment of FIG. 1.

Referring simultaneously to FIGS. 2 and 3, the present invention prefers to utilize structural ribs 78 and other such devices. The flange design shown in FIG. 2 for the outer surface 38 of flange 24 is typical. The flange has an overall diameter (D) of 1080 millimeters (42.5 in.), including a central core area 80 with a diameter of 610 millimeters (24 in.), which includes 25 millimeter diameter (1.0 in.) drive pin holes 70, 72 and an arbor hole 68 diameter of 80 millimeters (3.15 in.). The diameter of the hub (or boss) 43 on the inner surface 32 (FIG. 3) is approximately 584 millimeters (23 in.) The thickness of the flange, i.e. the distance between the inner and outer surfaces, varies from a maximum of substantially 1.5 inches at the circumferential rim 41 and structural ribs 78, to a minimum of substantially 0.25 inches in the valley areas 80 between the ribs. In terms of comparable strength, stiffness and durability, this compares to a non-ribbed flange body (i.e. a flange without structural elements) with a substantially uniform surface thickness of 1.5 inches thickness and 40 % greater weight. Therefore, the material cost of the ribbed flange is also dramatically lower than that of the flat composite flange.

Figure 4:
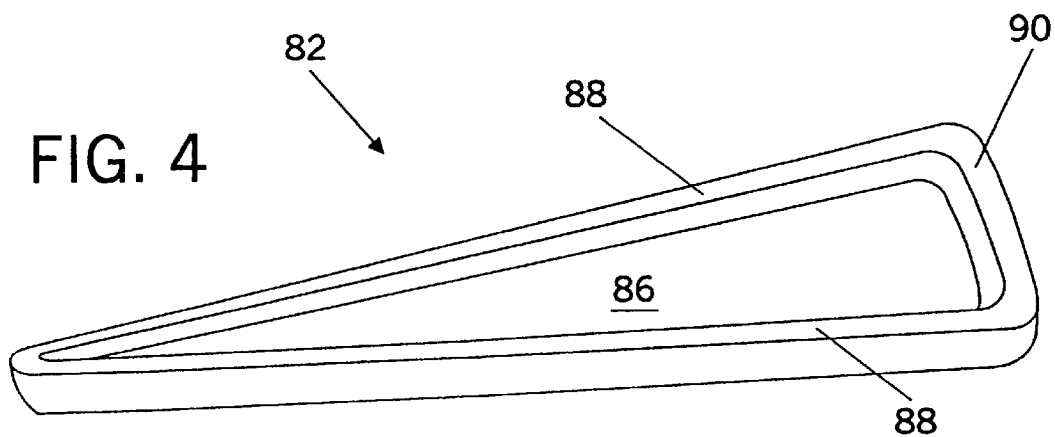
FIG. 4, is a partial perspective illustration of one embodiment of a feature of the flange structures of FIGS. 1, 2.
Figure 5:
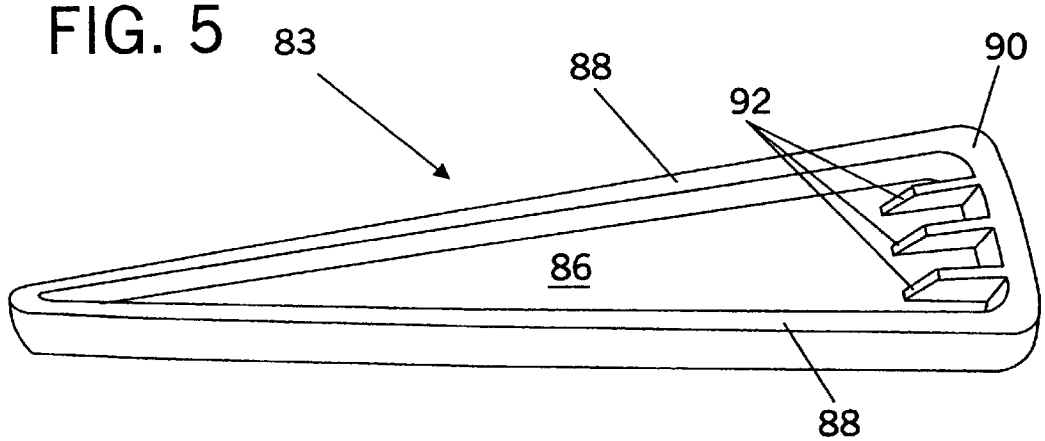
FIG. 5, is a partial perspective illustration of an alternative embodiment of the feature of FIG. 4.
Figure 6:
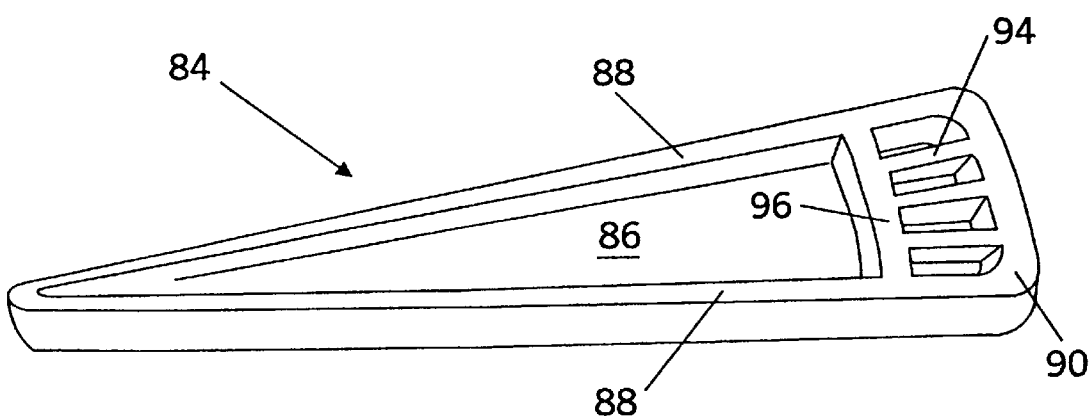
FIG. 6, is a partial perspective illustration of a still further alternative embodiment of the feature of FIG. 4.

The structural members, therefore, are significant to the economic viability of the present invention. For example, composite flanges of similar diameters were compression molded with ribs 78 that were 0.25 and 0.627 inches wide. Angled drop testing revealed that the broader rib withstood approximately twice the force required to break the thinner ribbed composite flange. Further strengthening of the flanges may be provided with added structural elements. For example, FIGS. 4 through 6 illustrate alternative segment embodiments 82–84 which are or may be incorporated into the structural arrays 74, 76. They each comprise known structural elements suitable for incorporation into the molded flange. In FIG. 4 the segment 82 includes flange disk valley surface 86, ribs 88, and circumferential rim 90 alone; similar to the structural segments illustrated in FIGS. 1–2. Alternatively, FIG. 5 illustrates segment 83 with similar ribs 88 and rim 90, but with the addition of gussets 92 emanating from the rim 90 and tapering to the valley surface 86.

Finally, FIG. 6 illustrates a further alternative segment 84 with ribs 88, rim 90, and gussets 94 disposed between the rim 90 and a second, inner circumferential rim 96.

The incorporation of ribbed gussets terminating in the flange disc or intermediate circumferential rims, shift and/or diffuse energy created by the reel loading and or by abusive handling of the reel. Thus, as the cable reel load increases it is preferred to increase the width dimension of the structural ribbing to improve the performance of the composite cable reel. Similar improvement can be obtained by increasing rib height or increasing the number of ribs on the composite flange.

It is preferred to design the composite flange of the present invention so that the composite reel performs comparably to wood flanged reels for cable reel applications up to 8000 pounds. The market volume for cable reels in excess of 8000 pounds is of insufficient size to justify the amortized cost of the compression mold tooling. From a design standpoint the present invention would increase either the rib thickness from 1.5 to 2 inches or increase the number of ribs on the outboard flange side from 24 to 32 to create a composite flange with stiffness and deflection properties comparable to a 2-inch thick wood reel. Other structural devices such as short rib gussets spaced equal distance between the ribs increase the stiffness of the weakest part of the composite flange, that being located at the composite flange's extreme outer edge. Devices such as the rib gusset can be utilized by the present invention to improve flange stiffness.

Table 1 is a listing of NEMA specifications for various materials reels, with payload weight range versus flange diameter range. In tests conducted, the present reel assemblies (20, FIG. 1) with the composite flange structures 22, 24 of FIGS. 2, 3, performed comparably to plywood and nailed dimension lumber flanged cable reels. A composite material flange with a 0.625 inch wide outer rim deflects at a comparable distance to 1.5 inch thick nailed dimension lumber

TABLE 1

| Different Reel Material-Types | General Purpose Steel | Heavy Duty Steel | NEMA Class 1 Wood | NEMA Class 2 Wood | NEMA Class 3 Wood | Non-Returnable Plywood |
|---|---|---|---|---|---|---|
| Flange Dia. (in.) | 42 to 108 | 42 to 108 | 36 to 96 | 20 to 96 | 36 to 108 | 14 to 45 |
| Load Capacity (pounds) | 1956 to 30,000 | 3260 to 4000 | 1500 to 6000 | 550 to 12,000 | 2500 to 15,000 | 100 to 3500 | flanges. In the tests, the composite flange reel assemblies were loaded with 700 pounds of fiber optic cable, and suffered no fractures or fatigue when dropped onto a concrete surface from a vertical height of 4 feet. On an equivalent basis, therefore, a composite reel with a 0.625 inch wide outer rim is capable of sustaining a force of 2800 foot pounds without damage. This exceeds NEMA's class 1 specification for a 36-inch nailed wood reel load limit of 1500 pounds. Further increasing the rim width from 0.625 inches to a maximum of 3 inches provides ample loading up to 8000 pounds without fear of flange failure.

In the present invention there are different percent weight combinations of plastic and wood constituents, as well as different wood type fillers. Various different composite mixtures were created and molded into flange structures having the flange rim-gusset design pattern illustrated in FIGS. 2, 3. Each composite mixture was assigned a different sample number. Table 2 lists the various sample by their number identification and composite mixtures.

For comparative strength testing to plywood and nailed dimension lumber flanges, the composite flange reel represents the composite composition inches in total distance from the inboard flange face to the termination of the outboard rim. The outer edge rim terminates into the disc with a 0.5 radius and into the rib with a 0.5 radius. The flange disc measured 0.25 inches in width. The flange face consists of 24 evenly spaced ribs. The rib

TABLE 2

| Sample Ingredients (wt %) | | Sample 1 | Sample 2 | Sample 3 | Sample 4 | Sample 5 | Sample 6 | Sample 7 |
|---|---|---|---|---|---|---|---|---|
| Southern Pine [1] | | | 30 | | | | 30 | 30 |
| Poplar[2] | | | | 30 | | | | |
| Poplar[3] | | | 30 | | 30 | 30 | | |
| Polyethylene[4] | | 50 | 30 | 30 | 30 | 12 | 60 | |
| Polyethylene[5] | | 50 | 30 | 30 | 30 | 55 | | 60 |
| MAPE[6] | | | | | | 3 | | |
| EMA[7] | | | 10 | 10 | 10 | | 10 | 10 |
| | TOTAL | 100 | 100 | 100 | 100 | 100 | 100 | 100 |
| ASTM test | UOM | | | | | | | |
| D790–969 Flex Modulus | MPa | 680 | 1474 | 1625 | 1573 | 1070 | 1630 | 1370 |
| D638–96 Tensile @ Break | MPa | 18.6 | 19.1 | 23.9 | 24.6 | 21 | 18.3 | 19.7 |
| D256–93a Notched IZOD | J/M | 154.9 | 42.6 | 42.4 | 45.9 | 73.6 | 47 | 69.2 |
| D638–96 Elong'g | % | 39 | 3.8 | 2.1 | 2.8 | 10 | 4 | 7.7 |

[1]Virgin Southern Pine thermo-mechanical pulp, 5 percent moisture content, fiber size expressed by grind distribution as a percentage by weight of which 50 percent greater than eight mesh screen, 20 percent finer than eight mesh screen but greater than sixteen mesh screen, 20 percent finer than sixteen mesh screen but greater than fifty mesh screen, and 10 percent finer than fifty mesh screen.
[2]Virgin Poplar thermo-mechanical pulp, 5 percent moisture content, fiber size expressed by grind distribution as a percentage by weight of which 50 percent greater than eight mesh screen, 20 percent finer than eight mesh screen but greater than sixteen mesh screen, 20 percent finer than sixteen mesh screen but greater than fifty mesh screen, and 10 percent finer than fifty mesh screen.
[3]Chemically unaltered Poplar kiln dried wood waste, 5 percent moisture content, fiber size expressed by grind distribution as a percentage by weight of which 50 percent greater than eight mesh screen, 20 percent finer than eight mesh screen but greater than sixteen mesh screen, 20 percent finer than sixteen mesh screen but greater than fifty mesh screen, and 10 percent finer than fifty mesh screen.
[4]Recycled polyethylene 0.95 lbs/in$^3$ density, 6.924 gm/10 min. melt flow rate per ASTM D1238.
[5]Recycled polyethylene 0.94 lbs/in$^3$ density, 0.70 gm/10 min. melt flow rate per ASTM D1238.
[6]Polybond 3009 by Uniroyal Chemical Corporation, maleic grafted polyethylene.
[7]Crystalene by Apex Specialty Polymers, Ltd., ethylene methacrylic.

as defined in Table 2, Sample Nos. 1–7. The composite components were blended in a low shear mixing device until blended. The blended composite components were fed to a Sterling six-inch extruder with an extruder screw compression ratio of 34:1. The composite components were extruded at a temperature of 400° F. The extruded composite shot was weighed to the desired flange weight of 25 pounds and placed in the compression mold. The compression mold was closed at a pressure of 220 tons psi at a moldtemperature of about 120° F. for a period of up to three minutes. The finished flange was cooled and than tested 72 hours after production.

The flange outer diameter was 35.5 inches. The outboard flange face outer edge rim was 0.625 inches in width and 1.5 extends outward 1.25 inches from the disc for a total height of 1.5 inches equal to that of the outer edge rim. The thickness of the rib at its top is 0.625 inches tapered to the disc at 2° with a 0.5 radius terminating into the disc. Sixteen of the ribs have a measured span of nine inches inboard of the outer edge rim and inner hub. The eight ribs terminating into the four bolt hole locations have a span measuring eight inches. The outboard hub area includes four evenly spaced bolt and washer holes and a central arbor hole measuring 3.16 inches in diameter. The diameter of the outboard hub area is 16 inches.

The inboard face circumferential boss is 0.5 inches thick with an outside diameter of 14.9 inches and an inboard diameter of 13.8 inches. The boss measures 0.75 inches in height. Twelve ribs of equal span of 5.67 inches evenly spaced at 0.375 inches in height, with a 0.20 radius terminating into the boss and the arbor hole. Each rib is tapered 7° with a 0.5 radius terminating into the disc. The disc thickness on the inboard hub is 0.25 inches thick.

Tested composite reel flanges were assembled with an 18-inch long fiberboard drum. The drum measured one inch in thickness, with an outer diameter of 16 inches and inner diameter of 15 inch. The three piece reel consisting of two improved composite flange and the fiber board drum were assembled and held together with four 0.25 inch bolts measuring about 20 inches in length. The bolts were tightened to a pressure of 45 foot pounds.

Comparative wood reels consisted of nailed dimension lumber flanges which were 1.5 inches and 36-inches in diameter, and plywood reel flanges which were 1 inch thick and also 36 inches in diameter; each in accordance with NEMA Class 1 specifications. The drum and bolt assembly for the tested wooden reels were identical to the test composite reels. All of the tested reels were loaded with 2500 feet of 1-inch diameter coaxial cable weighing 295 lbs, and manufactured by ComScope, Inc.

Table 3 demonstrates the superior strength and stiffness obtained by the composite composition compared to un-reinforced plastic. Such characteristics are vital to producing a cable reel flange with sufficient stiffness to avoid flange deflection during cable loading and sufficient strength to withstand the rigors of everyday handling. Table 2 further demonstrates the comparable composite performance properties obtained with composite compositions reinforced with discontinuous lignocellulose fiber derived from southern pine, hardwood and hardwood derived from kiln dried wood waste such as pallets. The reduction in composite IZOD impact properties compared to un-reinforced plastic is compensated in reel flange application by incorporating design features into the flange such as structural ribs to further enhance the stiffness, thus improving flange impact properties.

TABLE 3

Ambient Deflection Test

| Applied Force 100 lbs./sq. inch | Nailed Wood Flange | Composite Flange Sample #5 | Composite Flange Sample #1 |
|---|---|---|---|
| Deflection distance Under Load | 0.25 inches | 0.268 inches | 0.635 inches |

Deflection testing from Table No. 3 consisted of individual cable reel flanges clamped to a fixed structure with 100 lbs./sq. in. of force applied by a Enerpac Model JHL 3 ton Hydraulic Jack at the same fixed point on the very out board edge of all flanges. Flanges were measured at the fixed point before and after the 100 lbs./sq. in. force was applied. The measured distance differential before and after the force was applied determined the total deflection of the flange. All tests were performed at an ambient temperature of 72° F.

Table No. 3 demonstrates that flanges produced from polyethylene reinforced with discontinuous lignocellulose wood fiber possess deflection properties comparable to that of nailed wood flanges and superior to that of un-reinforced plastic. Wire and cable production loading the present invention will perform as would nailed wood flanges. Flanges produced from un-reinforced plastic deflect during loading beyond limits acceptable to wire and cable manufacturers.

TABLE 4

Deflection Test at −20° F.

| Applied Force 100 lbs./sq. inch | Nailed Wood Flange | Plywood Flange | Composite Flange Sample #5 |
|---|---|---|---|
| Deflection Distance Under Load | 0.17 inches | 0.15 inches | 0.16 inches |

In the test results of Table 4 assembled empty reels were inserted into an environmental chamber for 10 days at a constant temperature of −20° F., where upon each was removed and 100 lbs. per square inch of force was applied to the very out board edge of one flange per reel by a hydraulic jack. The inner distance between the flanges of each assembled reel was measured before and after the force was applied. The measured distance differential before and after the force was applied determined the total deflection of the flange.

TABLE 5

Deflection Test at +140° F.

| Applied Force 100 lbs./sq. inch | Nailed Wood Flange | Plywood Flange | Composite Flange Sample #5 |
|---|---|---|---|
| Deflection Distance Under Load | 0.26 inches | 0.21 inches | 0.53 inches |

The test procedure for the Table 5 data were the same as for Table 4 with the exception that the assembled reels were inserted into an environmental at a constant temperature of +140 F prior to testing.

The results from Table 4 and 5 demonstrate that under extreme temperature conditions the composite flange performed comparably to nailed wood and plywood flanges. Consequently, polyethylene is the preferred polymer of the current invention given it's ability to perform comparably to nailed wood and plywood reels in out of door field applications under extreme temperature conditions.

TABLE 6

| Test #1 | Initial Flange Weight | Water Bath Residence Time | Weight Gain | Weight Gain |
|---|---|---|---|---|
| Nailed Lumber Flange | 32 pounds | 4 weeks | 13.19 pounds | 41.2% |
| Composite Flange Sample #4 | 26 pounds | 8 weeks | 0.4 pounds | 1.5% |

Table 6 demonstrates the results of moisture absorption testing. Each flange was weighed and submersed and re-weighed over a period of 4 weeks for nailed dimension lumber and 8 weeks for the composite flange. The composite flange was inverted so that the out board face was face down. All reel flanges were allowed to stand for a period of 1 hour after removal from the water bath. Table 6 demonstrates that the composite flange is highly water resistant compared to nailed lumber flanges. Thus, the composite flange exposed to moisture will not swell, warp, distort or discolor after extended periods of outdoor storage. In turn, allowing composite flange reels to be readily reused after extended periods of outdoor storage. Water soaked nailed wood reels contract as they air dry resulting in warped flanges, raised and uneven surfaces and protruding nails. After periods of out of door storage, such wood reels are unusable and non recyclable.

TABLE 7

Drop Test Results - Survival Heights

| Test #1 | Empty Vertical Drop | Loaded Vertical Drop | Empty 20 Angle Drop | Loaded 20 Angle Drop |
|---|---|---|---|---|
| Nailed Lumber Flange | 48 inches | 48 inches | 48 inches | 24–36 inches |
| Plywood Flange | 48 inches | 48 inches | 48 inches | 20–28 inches |
| Composite Flange Sample #5 | 48 inches | 48 inches | 48 inches | 40–45 inches |

Table 7 shows the results of four drop tests that would be consistent with a free fall from a tractor trailer; a height of 48 inches. Drop testing consisted of hoisting assembled cable reels empty and loaded with 295 pounds of coaxial cable. The drop testing consisted of hoisting reels at various heights and allowing the reels to freely drop on an 8 inch thick concrete surface. Vertical drops were completed whereby the free falling reels struck the surface with both flanges simultaneously. 20 degree angle drops were completed whereby each reel was preset at an angle of 20 degree, hoisted and allowed to free fall so that only one flange struck the surface with the entire force of the fall. All reels in both vertical and angled drop testing were dropped at increasing heights of 6 inch intervals until either the reel or flange failed or a height of 48 inches was reached without failure. All reels were dropped at an ambient temperature of 72° F. All reels were inspected for damage after each fall and were determined to have failed if the reel had broken beyond the ability to be reused. Such failures would be described as broken flanges, and, or cracked structural members.

The drop test results from Table 7 demonstrate that the strength and durability of the present reel assembly is comparable, if not superior to, that of the plywood and nailed wood reels. Thus the reels of the present invention are as or more durable than as wood reels in extreme handling conditions.

TABLE 8

| Test #2D | Sample #4 | Sample #5 | Sample #6 | Sample #7 |
|---|---|---|---|---|
| Loaded 20° Angle Drop | 20 to 24 inch PASS | 40 to 45 inch PASS | 14 to 18 inch PASS | 24 to 27 inch PASS |

As shown in Table 8, high density polyethylene with melt flow indices in excess of 7 gm/0 min. melt flow per ASTM D1238 as prepared in Sample 6 perform poorly compared to composite flanges produced at a 0.70 gm/10 min. melt flow or a mixture of the two. Thus, it is preferred to utilize polyethylene or polyethylene with a melt flow index less than 6 gm/10 min. melt flow per ASTM D1238.

Furthermore, as the melt flow index decreases the notched Izod and elongation in properties of the composite composition improve, resulting in improved drop performance of the composite reels, as demonstrated in Table 8. To obtain comparable or superior destructive properties over wood reels requires a combination of flange design as exemplified in Figure #1 and material physical properties consisting of 1000 or greater MPa flexible Modulus, 19.1 MPa or greater tensile strength at break point, 40 or greater J/M notched IZOD and 2% or greater elongation.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

I claim:

1. A reel assembly, comprising:
   a central member, having a central aperture extending between opposite axial ends thereof; and
   at least two flange structures, each having spaced apart, first and second major surfaces, each said first major surface having a hub portion adapted to fixedly engage said central aperture at an associated one of said axial ends, each said flange structure comprising a thermoplastic composite material, said thermoplastic composite material including from about 20 to about 50 percent by weight of discontinuous lignocellulose fiber filler, wherein at least about 20% by weight of the fibers in said lignocellulose fiber filler have a length in excess of about 15 millimeter and a diameter of less than about 0.5 millimeter, and wherein less than about 10% by weight of said thermoplastic composite comprises a coupling agent.

2. The reel assembly of claim 1, wherein
   said flange structures each include at least one mounting hole extending therethrough, from said hub portion of said first major surface to said second major surface; and wherein
   said reel assembly further comprises at least one fastener, each adapted to pass through an associated mounting hole in each said flange structure to fixedly engage each said flange structure to said central member.

3. The reel assembly of claim 2, wherein
   said first and second major surfaces each comprise substantially circular surface areas, including a first major surface circular surface area and a second major surface circular surface area, each at a substantially equal diameter in the range of from eight inches to ninety six inches; and wherein
   said flange structures each further include an arbor hole disposed centrally of said circular surface areas and extending from said hub portion of first major surface to said second major surface.

4. The reel assembly of claim 3, having a payload carrying capacity of up to about 8,000 lbs.

5. The reel assembly of claim 3, wherein said flange structures further comprise structural elements formed in said first major surface and said second major surface.

6. The reel assembly of claim 5, wherein
   said first major surface circular surface area and said second major surface circular area each comprise concentric regions, including a first region substantially in register with said hub portion, adjacent said arbor hole, and including a second region extending outbound from said first region to the perimeter of said circular surface area; and wherein
   said structural elements include a first array of ribs disposed within said first region of said first major surface and extending radially from said arbor hole, and a second array of ribs disposed within said second region of said second major surface and extending radially from said first region to a circumferential rim disposed along the perimeter of said second major surface.

7. The reel assembly of claim 6 wherein said second array of ribs are equally spaced within said second region, said ribs varying in width from 0.20 inches to 2.5 inches and projecting 0.20 inches to 3 inches in height from said second major surface.

8. The reel assembly of claim 7 wherein said second array of ribs range in number from 12 to 48.

9. The reel assembly of claim 6, wherein the terminating ends of said second array of ribs are radiused into said circumferential rim and into said first region at 0.10 inches to 2 inches.

10. The reel assembly of claim 6 further comprising a plurality of gussets, at least one thereof being disposed intermediate to adjacent ones of said ribs.

11. The reel assembly of claim 6, wherein
said hub portion comprises a circumferential boss measuring from 4 inches to 50 inches in diameter, with a circumferential wall ranging in thickness from 0.10 inches to 4 inches and projecting form said first surface major surface at a height of from 0.20 inches to 10 inches in height.

12. The reel assembly of claim 11 wherein said first array of ribs are disposed within said circumferential boss; said ribs measuring from 3.5 inches to 49.2 inches in length, said first array comprising up to 24 ribs.

13. The reel assembly of claim 1, wherein said lignocellulose fiber filler comprises thermomechanically processed wood fiber.

14. The reel assembly of claim 1, wherein said processed wood fiber is chemically-unaltered.

15. The reel assembly of claim 1, wherein said processed wood fiber comprises hardwood.

16. The reel assembly of claim 1, wherein said processed wood fiber comprises softwood.

17. The reel assembly of claim 1, wherein said discontinuous lignocellulose fiber filler comprises less than about 5%, by weight, of moisture.

18. The reel assembly of claim 1, wherein said coupling agent comprises ethylene methacrylic.

19. The reel assembly of claim 1, wherein said coupling agent comprises maleic anhydride grafted polyethylene.

20. The reel assembly of claim 1, wherein said thermoplastic composite material comprises from about 40 percent to about 70 percent, by weight, of polyethylene.

21. The reel assembly of claim 20, wherein said polyethylene has a melt flow index of less than about 6 grams/10 minutes.

22. The reel assembly of claim 20, wherein said polyethylene compromises post use polyethylene.

23. The reel assembly of claim 1, wherein said thermoplastic composite material has a flexural modulus value of at least about 1000 Mpa.

24. The reel assembly of claim 1, wherein said thermoplastic composite material has a tensile at break value of at least about 19 Mpa.

25. The reel assembly of claim 1, wherein said thermoplastic composite material has a notched Izod value of at least about 40 J/M.

26. The reel assembly of claim 1, wherein said thermoplastic composite material has an elongation value of greater than 2%.

27. The reel assembly of claim 1, wherein said first and second major surfaces are spaced apart at a distance of from 0.5 inches to 3.0 inches.

28. The reel assembly of claim 1, wherein said flanges each absorb less than about 5 percent by flange weight of water when submerged in water for 8 weeks.

29. The reel assembly of claim 1, wherein said central member is comprised of material selected from among fiberboard, wood, and thermoplastic materials.

30. A flange structure, for use in a reel assembly of the type having a drum for fixedly engaging a flange at each end of an aperture extending axially therethrough, the flange structure comprising a body formed from a thermoplastic composite material having from about 20 to about 50 percent by weight of a discontinuous lignocellulose fiber filler, wherein at least about 20% by weight of the fibers in said lignocellulose fiber filler have a length in excess of about 15 millimeter and a diameter of less than about 0.5 millimeter, and wherein less than about 10% by weight of said thermoplastic composite comprises a coupling agent, said body having spaced apart, first and second major surfaces, said first major surface having a hub portion adapted to fixedly engage the axial end of the drum.

31. The flange structure of claim 30, wherein said flange body includes one or more mounting holes disposed therethrough from said hub portion of said first major surface to said second major surface.

32. The flange structure of claim 31, wherein said first and second major surfaces each comprise substantially circular surface areas, including a first major surface circular surface area and a second major surface circular surface area, said flange body further including an arbor hole disposed centrally of said circular surface areas and extending from said hub portion of first major surface to said second major surface.

33. The flange structure of claim 30, wherein said lignocellulose fiber filler comprises thermomechanically processed wood fiber.

34. The flange structure of claim 33, wherein said flange body further comprise structural elements formed in said first major surface and said second major surface.

35. The flange structure of claim 34, wherein
said first major surface circular surface area and said second major surface circular area each comprise concentric regions, including a first region substantially in register with said hub portion, adjacent said arbor hole, and including a second region extending outbound from said first region to the perimeter of said circular surface area; and wherein
said structural elements include a first array of ribs disposed within said first region of said first major surface and extending radially from said arbor hole, and a second array of ribs disposed within said second region of said second major surface and extending radially from said first region to a circumferential rim disposed along the perimeter of said second major surface.

36. The flange structure of claim 35, wherein said second array of ribs are equally spaced within said second region, said ribs varying in width from 0.20 inches to 2.5 inches and projecting 0.20 inches to 3 inches in height from said second major surface.

37. The flange structure of claim 36, wherein said second array of ribs range in number from 12 to 48.

38. The flange structure of claim 35, wherein the terminating ends of said second array of ribs are radiused into said circumferential rim and into said first region at 0.10 inches to 2 inches.

39. The flange structure claim 35, further comprising a plurality of gussets, at least one thereof being disposed intermediate to adjacent ones of said ribs.

40. The flange structure of claim 35, wherein
said hub portion comprises a circumferential boss measuring from 4 inches to 50 inches in diameter, with a circumferential wall ranging in thickness from 0.10 inches to 4 inches and projecting form said first surface major surface at a height of from 0.20 inches to 10 inches in height.

41. The flange structure of claim 40 wherein said first array of ribs are disposed within said circumferential boss; said ribs measuring from 3.5 inches to 49.2 inches in length, said first array comprising up to 24 ribs.

42. The flange structure of claim 30, wherein said processed wood fiber is chemically-unaltered.

43. The flange structure of claim 30, wherein said processed wood fiber comprises hardwood.

44. The flange structure of claim 30, wherein said processed wood fiber comprises softwood.

45. The flange structure of claim 30, wherein said discontinuous lignocellulose fiber filler comprises less than about 5%, by weight, of moisture.

46. The flange structure of claim 30, wherein said coupling agent comprises ethylene methacrylic.

47. The flange structure of claim 30, wherein said coupling agent comprises maleic anhydride grafted polyethylene.

48. The flange structure of claim 30, wherein said thermoplastic composite material comprises from about 40 percent to about 70 percent, by weight, of polyethylene.

49. The flange structure of claim 48, wherein said polyethylene has a melt flow index of less than about 6 grams/10 minutes.

50. The flange structure of claim 48, wherein said polyethylene compromises post use polyethylene.

51. The flange structure of claim 30, wherein said thermoplastic composite material has a flexural modulus value of at least about 1000 Mpa.

52. The flange structure of claim 30, wherein said thermoplastic composite material has a tensile at break value of at least about 19 Mpa.

53. The flange structure of claim 30, wherein said thermoplastic composite material has a notched Izod value of at least about 40 JM.

54. The flange structure of claim 30, wherein said thermoplastic composite material has an elongation value of greater than 2%.

55. The flange structure of claim 30, wherein said first and second major surfaces are spaced apart at a distance of from 0.5 inches to 3.0 inches.

56. The flange structure of claim 30, wherein said flanges each absorb less than about 5 percent by flange weight of water when submerged in water for 8 weeks.

57. The flange structure of claim 30, wherein said central member is comprised of material selected from among fiberboard, wood, and thermoplastic materials.

* * * * *